United States Patent [19]

Aston et al.

[11] 4,318,681
[45] Mar. 9, 1982

[54] MANUFACTURE OF THERMOPLASTICS PIPE

[75] Inventors: William C. Aston, Halesowen; Derek Walker, Wakefield, both of England

[73] Assignee: IMI Yorkshire Imperial Plastics Limited, Leeds, England

[21] Appl. No.: 185,925

[22] Filed: Sep. 10, 1980

[30] Foreign Application Priority Data

Sep. 15, 1979 [GB] United Kingdom .............. 32060/79

[51] Int. Cl.³ ............................................. B29C 17/07
[52] U.S. Cl. .................... 425/392; 264/533; 264/535; 264/570; 264/573; 425/526; 425/541; 425/387.1
[58] Field of Search ............ 425/522, 526, 541, 387.1, 425/392, 393, 525, 535; 264/506, 507, 533, 535, 570, 573, 523, 531, 269

[56] References Cited

U.S. PATENT DOCUMENTS 2,983,961 5/1961 Titterton et al. ................... 264/506
4,049,762 9/1977 Martino et al. ................ 264/506 X

FOREIGN PATENT DOCUMENTS 42-16434 9/1967 Japan ................................ 264/531
1432539 of 0000 United Kingdom .

*Primary Examiner*—Jan H. Silbaugh
*Attorney, Agent, or Firm*—Cushman, Darby & Cushman

[57] ABSTRACT

Apparatus for use in the manufacture of socketed thermoplastics pipe by the radial expansion of a pipe blank. The apparatus includes an open-ended central mould portion 12 which can be raised or lowered on stanchions 10, 11 to three predetermined positions; a pair of mould end portions 15, 17 each having a supporting mandrel 19, 20 engageable with the pipe blank 28, end portions 15, 17 being advanceable to and retractable from the central mould portion 12. One of the mould end portions 15 is internally contoured to provide part of the socket-forming portion of the mould. The mould end portions 15, 17 can be held in an intermediate position, partially advanced towards the central portion 12 to locate the blank 28 on mandrels 19, 20 before closing of the mould.

10 Claims, 3 Drawing Figures

MANUFACTURE OF THERMOPLASTICS PIPE

BACKGROUND OF THE INVENTION

This invention relates to the manufacture of thermoplastics pipe. In particular, it is concerned with an apparatus for making a length of thermoplastics pipe by the radial expansion of a pipe blank within a circular cross-section mould. The invention is especially suitable for use with PVC (polyvinyl chloride) plastics to make pipes for water-supply and distribution purposes.

It has previously been proposed to heat a pipe blank within a mould and expand the pipe radially by means of liquid under pressure, see eg British Pat. No. 1,432,539. The expansion at the temperature specified in that specification causes orientation of the thermoplastics material, which gives an increased hoop strength in the finished product. In this manner, relatively high strength pipes can be formed using a minimum of thermoplastics, and the principle has been found particularly suitable for the manufacture of large diameter PVC pipes.

The finished pipe, which has a socket formed at one end, may be of the order of 10 meters long with a diameter of, say, 450 mm. (The starting blank has of course a smaller diameter). Both the blank and the finished pipe need to be handled and located with accuracy if the desired quality of product is to be achieved.

SUMMARY OF THE INVENTION

According to one aspect of the invention, we provide apparatus for use in the manufacture of a length of thermoplastics pipe of cylindrical cross-section having a socket at one end by the radial expansion of a thermoplastics pipe blank within a circular cross-section mould, said apparatus comprising a central mould portion substantially cylindrical in shape, said central mould portion being open at its end at which the socket is to be formed on the blank; a mould end portion adapted to engage and close said central mould portion at its open end, said end portion having a mandrel adapted to engage a blank whose end extends from the end of the central mould portion; means for supporting said central mould portion independently of the mould end portion, said supporting means being adapted to lower said central mould portion from a starting position where its longitudinal axis extends vertically above and parallel to the axis of the mandrel in the end portion, to a first predetermined position where the blank lying in the lowermost part of the central mould portion is able to be engaged by the mandrel, and to a second predetermined position below the first predetermined position where the longitudinal axis of the central mould portion coincides with that of the mould end portion and permits the mould end portion to be subsequently closed to the central mould portion; and means for advancing said mould end portion relative to the central mould portion, said advancing means being adapted to hold the mould end portion in three spaced positions, namely fully withdrawn from the central mould portion, partially advanced towards the central mould portion such that the mandrel engages the blank extending from the end of the central mould portion, with the mould end portion not yet closed to the central mould portion, and fully advanced with the mould end portion fully closed to the central mould portion.

The central mould portion may be openable at both ends, and a second mould end portion provided which has a mandrel whose axis coincides with that of the first mould end portion. Means for advancing the second mould end portion towards the central mould portion is also suitably provided, and may be similarly adapted to be holdable at the three spaced positions referred to above.

Each said mould end portion preferably houses a seal which is capable of being pressurized to grip the ends of the pipe blank, so that during expansion of the blank, the blank is prevented from contracting in length.

Said advancing means is also preferably adapted to hold its respective mould end portion to the central mould portion during the subsequent processing of heating and radially expanding the blank.

One mould end portion preferably has an interior which comprises at least part of a socket-forming portion for the formed pipe. There may also be part of the socket-forming portion in the central mould portion whose diameter is increased towards the end of the central mould portion adjacent the end portion having the remainder of the socket-forming portion. The internal groove for the pipe sealing ring in the pipe socket is preferably formed at the junction of the socket-forming mould end portion and the central mould portion.

The mould end portion advancing means for each of the mould end portions may be adapted to be operable independently of or simultaneously with each other. After the pipe has been expanded and cooled, the mould end portions and their associated advancing and withdrawal mechanisms may be adapted to be operable such that the mould end portion including part of the socket-forming portion is withdrawn prior to the withdrawal of the other mould end portion.

During the sequence of closing the mould, the two end portions and their associated advancing equipment may be adapted to advance simultaneously towards the central mould portion.

The apparatus may include means for tilting the central mould portion towards one end. The supporting means may include spaced supports with associated lowering and raising means which can be operable either simultaneously or independently. Such means may include hydraulically, mechanically or pneumatically operable piston and cylinder arrangements mounted on the support means. One of the piston and cylinder assemblies may be tiltable with respect to the support, in order to permit tilting of the central mould portion about an axis extending through another supporting means. The tilting mechanism may be employed after the mould end portions have been withdrawn from the central mould portion. The central mould portion may be raised only at the end adjacent the mould end portion having part of the socket-forming portion therein, thereby permitting water used in the expansion or cooling of the pipe blank to run out of the opposite end of the formed pipe. In this case the piston and cylinder assembly mounted on the support adjacent the other end of the central mould portion may have a trunnion mounted to the support, and the connection between the piston and the central mould portion may be provided with sufficient freedom of movement to enable the tilting action to occur.

BRIEF DESCRIPTION OF THE DRAWINGS

An embodiment of the invention will now be described, by way of example only, with reference to the accompanying drawings, in which.

DESCRIPTION OF THE PREFERRED EMBODIMENTS

Figure 1:
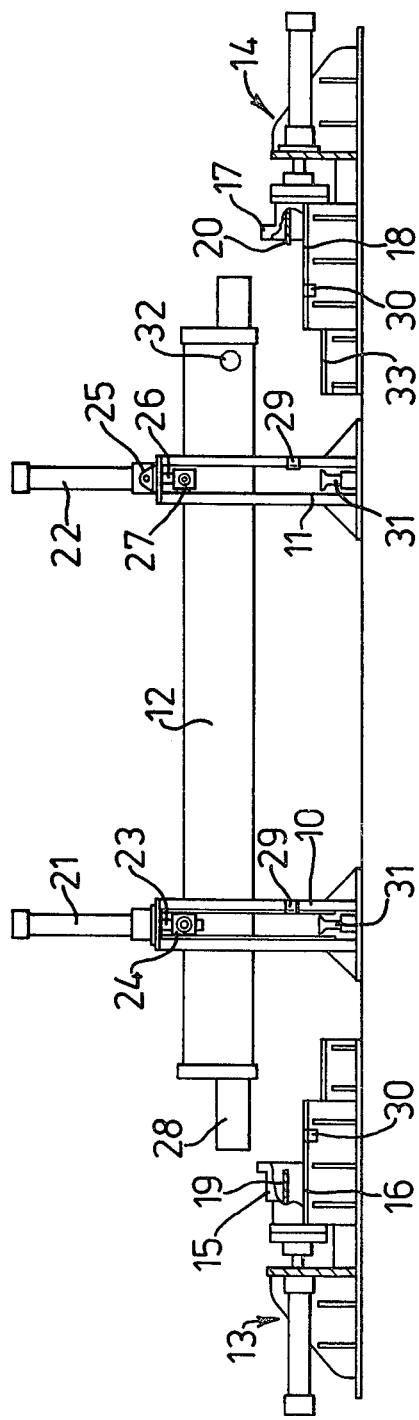
FIG. 1 is a side elevation of apparatus according to the invention shown in a first position.

A pair of vertical stanchions 10 and 11 are spaced along the line of the apparatus, and support a central mould portion 12. The central mould portion 12 is generally cylindrical in shape having a circular internal cross-section, and extends beyond the stanchions 10 and 11 at each end.

First and second hydraulically-operable ram assemblies 13 and 14 are located at positions spaced from the ends of the central mould portion 12, the rams being operable to move horizontally towards and away from the ends of the central mould portion 12. The first ram assembly 13 carries a first mould end portion 15 which is supported on a first guide track 16 extending towards the stanchions 10, 11. Similarly, the second ram assembly 14 carries a second mould end portion 17 which is supported on a second guide track 18 extending in an opposite direction towards stanchions 10, 11. The two ram assemblies 13, 14 are operable either simultaneously or separately.

The first mould end portion 15 is internally contoured to provide part of the socket-forming portion of the mould, the remainder of the socket-forming portion being located in the end of the central mould portion 12 closest to the first mould end portion 15. The diameter of the central mould portion is increased towards the end of the central mould portion adjacent the socket-forming mould end portion. A centrally-positioned hollow mandrel 19 extends within the first mould end portion 15, and has an external diameter slightly smaller than the internal diameter of the pipe blank to be inserted in the mould.

The second mould end portion 17 also has a centrally-positioned hollow mandrel 20 of the same diameter as that in the first mould end portion 15. The second mould end portion 17 tapers outwardly towards the open end facing the central mould portion 12. An annular space is provided around part of each mandrel 19, 20 such that the pipe blank when positioned in the mould ready for expansion extends into each annular space and is held by a seal which is capable of being pressurized to grip the ends of the pipe blank to prevent axial contraction of the pipe blank as it expands radially.

Each stanchion 10, 11 carries a hydraulically-operable piston and cylinder assembly, 21 and 22 respectively, mounted to the top of the stanchion. The piston and cylinder assembly 21 closest to the socket end of the mould is flange-mounted to stanchion 10 and the piston rod 23 extends downwardly to a yoke 24 attached to the upper side of the central mould portion 12. At its sideways extremities, yoke 24 is slidably moveable in a vertical direction between the uprights of stanchion 10, thereby ensuring that the central mould portion 12 is held longitudinally.

The piston and cylinder assembly 22 is trunnion-mounted at 25 to the top of stanchion 11, with the piston rod 26 attached to a yoke 27 mounted to the upper side of the central mould portion 12. This arrangement permits the piston and cylinder assembly 22 with its associated rod 26 to pivot relative to the top of stanchion 11, for reasons to be described later.

In use, a PVC pipe blank 28 is conveyed from a storage rack (not shown) in a direction parallel to its longitudinal axis, and enters the central mould portion in its first position as seen in FIG. 1. The blank 28 is longer than the central mould portion 12 and is positioned in the central mould portion 12 such that its ends extend out of either end of the central mould portion 12. The outward extension is arranged to be greater at the end of the central mould portion 12 adjacent the first or socket-forming mould end portion 15. The first and second mould end portions 15 and 17 are in their fully retracted positions as seen in FIG. 1.

Figure 2:
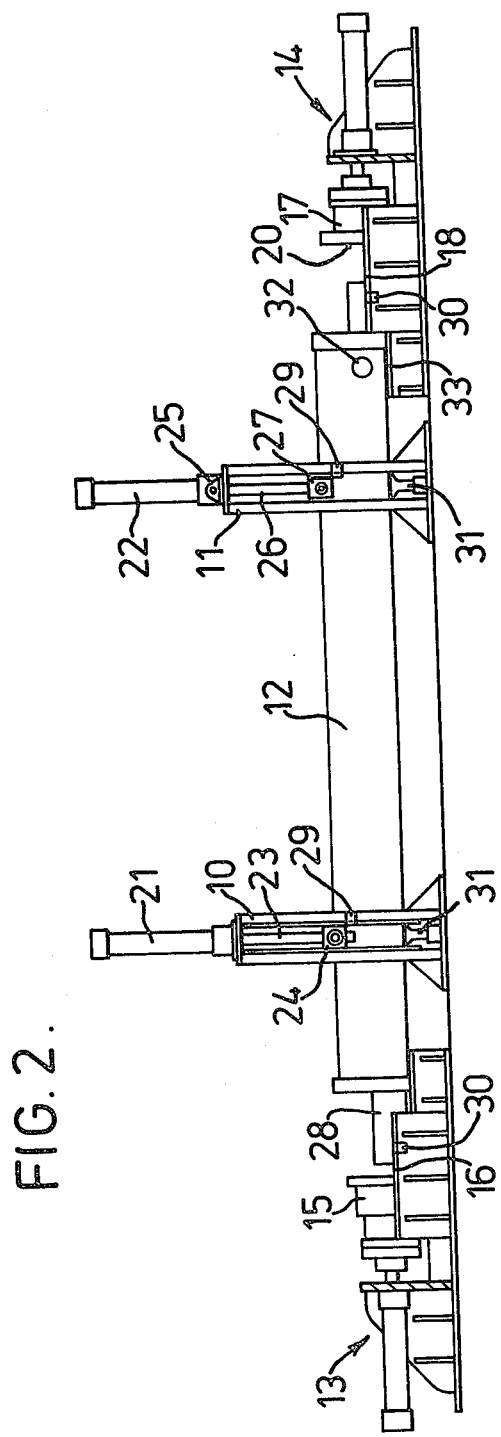
FIGS. 2 and 3 are similar elevations to FIG. 1 but with the apparatus illustrated in second and third positions respectively.

Piston and cylinder assemblies 21 and 22 are now actuated to lower the central mould portion 12 containing the blank 28 to a first predetermined position shown in FIG. 2. The central mould portion 12 is supported in this position by hydraulic jacks 31 positioned within stanchions 10 and 11 under the central mould portion 12, the jacks 31 being in a raised position. The blank 28 rests on the lower most internal surface of the central mould portion 12, and the predetermined position is such that the co-axial mandrels 19, 20 can engage the central mould portion 12, the jacks 31 being in a raised position. The blank 28 rests on the lowermost internal surface of the central mould portion 12, and the predetermined position is such that the co-axial mandrels 19, 20 can engage the interior surface at the ends of blank 28. Each pair of mandrels is suitable for use with only one internal diameter size of pipe blank, and they will have chamferred ends to assist in their entry into the ends of the pipe blank 28. The first predetermined position is set by a pair of limit switches 29 on the stanchions 10 and 11 which are actuated by the respective yokes 24, 27 and which by means of suitable control circuits cause the respective piston and cylinder 21, 22 to come to rest.

Ram assemblies 13 and 14 are now actuated to simultaneously advance the mould end portions 15 and 17 towards the central mould portion 12. The spacing of the ends of blank 28 from the mandrels 19 and 20 prior to advancement is such that the chamferred ends of the mandrels engage the ends of the blank 28 at substantially the same time, and move inwardly within the ends of blank 28 until the ram assemblies 13, 14 are brought to rest with small gaps between the central mould portion 12 and the respective mould end portions 15 and 17. Limit switches 30 on guide track 16 are actuated by the advance of the mould end portions, and controls stop the movement of the two ram assemblies 13, 14 with the mould end portions 15, 17 at a predetermined position.

Figure 3:
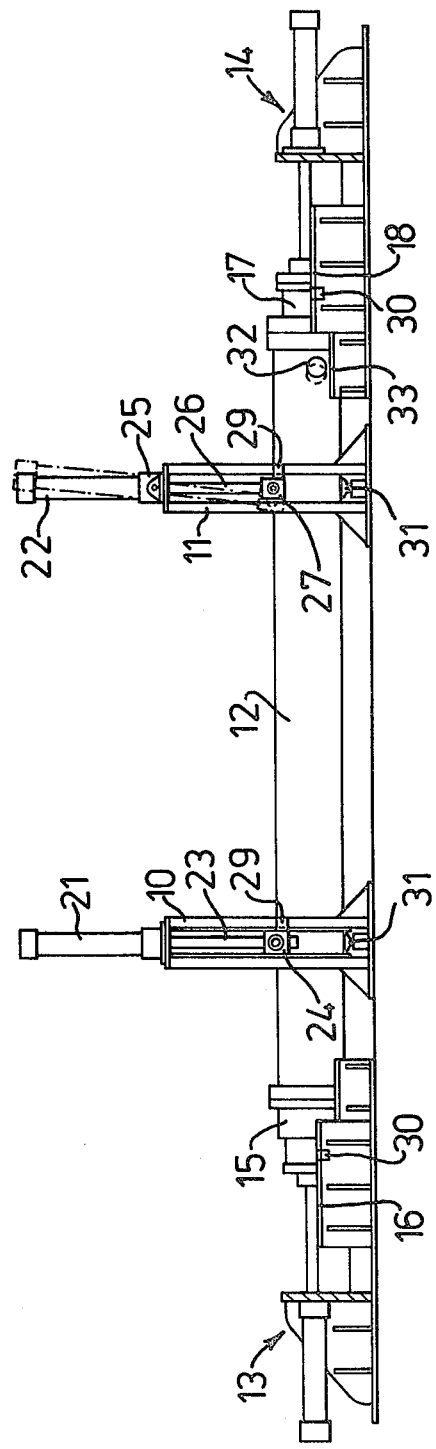

The piston and cylinder assemblies 21, 22 and the hydraulic jacks 31 are operated to lower the central mould portion 12 from its first predetermined position (see FIG. 2) to its second predetermined position (see FIG. 3) such that it is co-axial with the mould end portions 15, 17. The extent of the movement is determined by the lowered position of jacks 31 against which the central mould portion 12 comes to rest. When the central mould portion 12 is stationary in its second position, the ram assemblies 13, 14 are again actuated to close and locate the mould end portions 15, 17 in the central mould portion 12. In this position the blank 28 is supported at both its ends by the mould ends 15, 17. The end portions 15, 17 continue to be urged against the central mould portion to provide sealing of the mould during the subsequent operation. The ends of the blank 28 are held to the mandrel by gripping means.

Hot water is now pumped into the mould through passages (not shown) in the mould end portions, and the PVC pipe blank is allowed to heat up to the water temperature (around 90° C.). The blank 28 is then expanded radially by means of fluid pressure exerted from within the blank 28, thereby urging the blank 28 into engagement with the inner surfaces of both the central mould portion 12 and the mould end portions 15, 17. Following expansion, the pipe length is cooled by cold water passed through the pipe, and the expanded pipe with its socket portion is now ready for removal from the mould.

The mould end portions 15, 17 are withdrawn sequentially from the central mould portion 12 by the full retraction of the ram assemblies 13, 14, thereby pulling the mandrels 19, 20 out of the remaining portions of unexpanded blank 28 which were held by the gripping means. The first or socket-forming mould end portion 15 is withdrawn first after relaxing the grip on the end of the pipe held to mandrel 19, but with the other end of the pipe still held to mandrel 20. The second mould end portion 17 is then withdrawn, after relaxing the grip on the end of the pipe held to mandrel 20, the pipe being retained in the central mould portion 12 by virtue of its increasing diameter towards the end facing the first or socket-forming mould end portion 15.

The piston and cylinder assembly 21 mounted on stanchion 10 is now operated independently to lift the central mould portion 12 adjacent the first or socket-forming mould end portion 15, thereby tilting the central mould portion 12 towards the second mould end portion 17. The trunnion-mounting of the piston and cylinder assembly 22 on stanchion 11 permits the piston and cylinder assembly and its piston rod 26 to tilt as shown in dashed line in FIG. 3. A pivot pin 32, fixed adjacent the end of the central mould portion 12 distant from the socket-forming end portion 15, and moveable on a track 33, supports the lowermost end of the central mould portion 12 during the tilting operation. The yoke 27 has sufficient freedom of movement between the uprights of stanchion 11 to permit this tilting, and the operation enables water remaining in the formed pipe, particularly in the formed socket, to be poured out of the pipe into a suitable return conduit under the apparatus. It should be appreciated that at this stage there are small diameter portions at each end of the formed pipe, where the gripping mechanisms have held the pipe blank to the respective mandrels. These portions are cut off from the formed pipe after it has been removed from the mould.

We claim:

1. Apparatus for use in the manufacture of a length of thermoplastics pipe of cylindrical cross-section having a socket at one end by the radial expansion of a thermoplastics pipe blank within a circular cross-section mould, said apparatus comprising a central mould portion substantially cylindrical in shape, said central mould portion being open at its end at which the socket is to be formed on the blank; a mould end portion adapted to engage and close said central mould portion at its open end, said end portion having a mandrel adapted to engage a blank whose end extends from the end of the central mould portion; means for supporting said central mould portion independently of the mould end portion, said supporting means being adapted to lower said central mould portion from a starting position where its longitudinal axis extends vertically above and parallel to the axis of the mandrel in the end portion, to a first predetermined position where the blank lying in the lowermost part of the central mould portion is able to be engaged by the mandrel, and to a second predetermined position below the first predetermined position where the longitudinal axis of the central mould portion coincides with that of the mould end portion and permits the mould end portion to be subsequently closed to the central mould portion; and means for advancing said mould end portion relative to the central mould portion, said advancing means being adapted to hold the mould end portion in three spaced positions, namely fully withdrawn from the central mould portion, partially advanced towards the central mould portion such that the mandrel engages the blank extending from the end of the central mould portion, with the mould end portion not yet closed to the central mould portion, and fully advanced with the mould end portion fully closed to the central mould portion.

2. Apparatus according to claim 1 in which the central mould portion is openable at both ends, and a second mould end portion is provided, said mould end portion having a mandrel whose axis co-incides with the mandrel of the first mould end portion.

3. Apparatus according to claim 2 wherein means is provided for advancing the second mould end portion towards the central mould portion, said means being adapted to be holdable at the three spaced positions set out in claim 1.

4. Apparatus according to claim 2 in which each mould end portion houses a seal which is capable of being pressurised to grip the ends of the pipe blank, so that during expansion of the blank, the blank is prevented from contracting in length.

5. Apparatus according to claim 1 in which the mould end portion has an interior which comprises at least part of a socket-forming portion for the formed pipe.

6. Apparatus according to claim 5 wherein an internal groove for a pipe sealing ring in the pipe socket is formed at the junction of the socket-forming mould end portion and the central mould portion.

7. Apparatus according to claim 2 in which the mould end portion advancing means for each of the mould end portions are adapted to be operable independently of or simultaneously with each other.

8. Apparatus according to claim 7 in which, following expansion and cooling of the formed pipe, the mould end portions and their associated advancing and withdrawal mechanisms are adapted to be operable such that the mould end portion including part of the socket-forming portion is withdrawn prior to withdrawal of the other mould end portion.

9. Apparatus according to claim 1 including means for tilting the central mould end portion towards one end.

10. Apparatus according to claim 9, including spaced supports for the central mould portion, and in which the central mould portion is adapted to be tilted about an axis extending through one of the supports.

* * * * *